Oct. 25, 1960 R. C. JENNESS ET AL 2,957,732
NONLEAKING BEARING ASSEMBLY
Filed Nov. 24, 1958

Inventors
Raymond C. Jenness
Eugene F. Rossi
by Richard R. Mybeck
Attorney

United States Patent Office 2,957,732
Patented Oct. 25, 1960

2,957,732

NONLEAKING BEARING ASSEMBLY

Raymond C. Jenness and Eugene F. Rossi, Milwaukee, Wis., assignors to Allis-Chalmers Manufacturing Company, Milwaukee, Wis.

Filed Nov. 24, 1958, Ser. No. 775,826

9 Claims. (Cl. 308—36.5)

The present invention relates generally to the art of lubrication and more particularly to improved means for sealing the main bearings of rotating machines such, for example, as grinding mills and the like which require constant flushing with a lubricant, such as oil, during operation because of the heavy loads they receive.

In machines of this type, serious health and safety problems result from the leakage of lubricant through the interface between the bearing housing, which contains the bearing, and the rotating member. The lubricant which leaks through this interface accumulates on the outside surface of the bearing housing from whence it runs and is thrown onto the floor and into the surrounding area, where it soils and contaminates all within reach. The escaped oil creates hazardous and slippery footing conditions and collects dirt and other foreign matter which readily transfers to all with which it comes in contact. The slippery footing for and slippery gloves of the workman near the machines constitute a clear safety hazard. In addition, the escaped oil has been known to even contaminate the material being processed in the machine.

Various prior art proposals have attempted to solve these problems which result from the leakage of lubricant from within the bearing housing. None have succeeded in fully solving the problem in a commercially practicable manner since each is attended by its own objectionable features.

The most successful means proposed in the prior art appears to be a packing or stuffing ring formed of a fibrous or like absorptive material. In practice a stuffing ring is formed firmly in place circumferentially about the rotating member, in a groove defined for the purpose and snugly interposed between the rotating member and the bearing housing. While fibrous packings are successful in preventing the lubricant leakage for a while after installation, they quickly become compacted through the combined action of wear and the lubricant whereupon they lose their fullness and create leakage regions between the relatively moving parts. When these regions develop, the lubricant resumes leaking and the machine must be taken out of production, at least partially dismantled, and restuffed before the leakage will stop.

In general, the present invention solves these problems attendant lubricant leakage by providing a substantially permanent damming and wiping mechanism in a bearing assembly. The structure of this invention includes a ring shaped damming supporting means and a specially positioned unique gravity loaded wiping means borne thereby which coact to substantially eliminate the leakage of lubricant from the bearing housing by the combined action of diversion and blocking upon the flow of lubricant.

Accordingly, a prime object of the present invention is to provide means for inhibiting and substantially preventing the leakage of lubricant from within the bearing housing in machines of the type described which means are capable of functioning with little impairment of effectiveness for significantly longer times than means heretofore available.

Another object of the present invention is to provide means for inhibiting and substantially preventing the leakage of lubricant from within the bearing housing of machines of the type described which means, by virtue of its improved design, automatically adjusts itself to conform to conditions of wear encountered during operation.

Another object of the present invention is to provide means for inhibiting and substantially preventing the leakage of lubricant from within the bearing housing of machines of the type described which means are characterized by a specially positioned, pivotally connected, gravity loaded wiper to divert the flow of lubricant toward the bearing while substantially preventing the flow of lubricant toward the bearing housing.

A still further object of the present invention is to provide means for inhibiting and substantially preventing the leakage of lubricant from the main bearing housings of machines of the type described which means are characterized by applying the combined actions of diversion and blocking upon the flow of lubricant.

These and other objects as shall hereinafter appear are readily fulfilled by the present invention and can be readily discerned from the following detailed description of an embodiment exemplary thereof, particularly when read in conjunction with the accompanying drawing in which like parts bear like numerals throughout the several figures.

Figure 1:
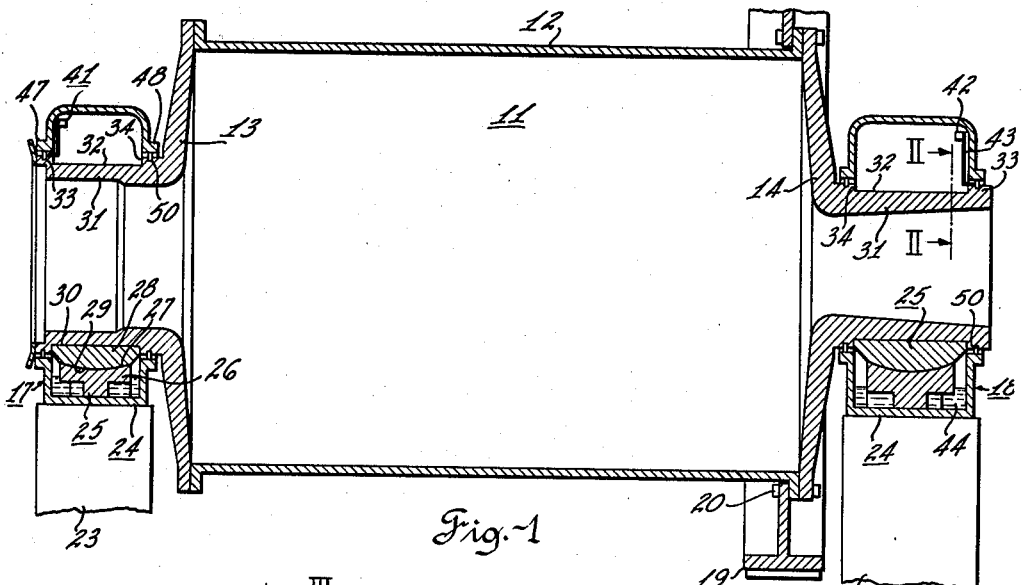
Fig. 1 is a side elevation, partially in section, of a tube mill embodying the present invention.

As shown in the drawing, the present invention is illustrated in conjunction with a grinding mill 11 having a rotatable tubular shell 12 suitably secured at its feed end as by welding, circumferential bolting and the like, to a mill head trunnion assembly 13 (herein called trunnion) and at its discharge end to similar trunnion 14. Trunnions 13, 14 are respectively mounted for rotation within trunnion bearing assemblies 17, 18 for rotation therein relative thereto in response to suitable driving means such, for example, as drivable ring gear 19 suitably secured to trunnion end flange 14 as by welding, with circumferentially spaced bolts 20, and the like, and driven by a prime mover (not shown) to rotate shell 12 whereupon trunnions 13, 14 rotate within and relative to their respective trunnion bearing assemblies 17, 18.

Each trunnion bearing assembly, for example assembly 17, is mounted upon a supporting pedestal 23 which extends upwardly from a suitable base or foundation (not shown) to support and secure bearing housing 24. A bearing 25 is mounted within bearing housing 24 and comprises a support member 26, which may be provided with a concave inner surface 27, for supporting a bearing saddle 28 which may be provided with a convex outer surface 29 substantially complementary to the concave surface 27 of member 26. The inner surface 30 of bearing saddle 28 defines an arcuate trunnion engaging surface to establish a running engagement between surface 30 and journal portion 31 of trunnion 13, and more particularly between surface 30 and a bearing surface 32 defined upon trunnion journal portion 31 intermediate outwardly extending radial flanges 33, 34 which respectively bound bearing saddle 28 and its respective sides to prevent the lateral slipping and sliding thereof.

Suitable oiling means 41 are provided within bearing housing 24 so that bearing surface 32 on trunnion journal portion 31 and bearing inner surface 30 are flushed with an abundance of oil or like lubricant at all times during the operation of the mill. Excellent means comprise a ladle 42 of the type described by George O. Verch in pending United States application Serial No. 569,155, now Patent No. 2,869,940, although conventional drip pans, wicks and the like are found suitable in the practice of this invention.

As shown in Fig. 1, in connection with bearing assembly 18, ladle 42 extends from an arm portion 43 secured to trunnion 14 for rotation therewith into and out of a suitable supply of lubricant such, for example, as oil reservoir 44, so that during rotation of shell 12 and trunnions 13, 14, ladle 42 is rotated into and out of reservoir 44 whereby it is filled with lubricant on its downswing and spills the lubricant over trunnion surface 32 during its upswing. In this manner, the trunnion bearing surface 32 is covered with lubricant and, upon rotation and by gravity flow, carries the lubricant to the inner surface 30 of the bearing saddle 28 to keep these surfaces flushed with oil throughout operation of the mill. It is of course understood that while only one bucket means is described and shown with respect to each bearing assembly, a plurality of such buckets may be employed either axially aligned or staggered to provide any quantity of lubricant which may be required.

Figure 3:
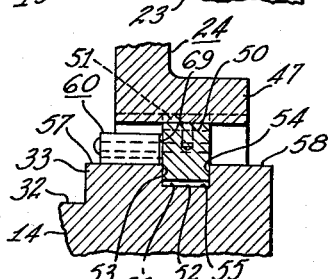
Fig. 3 is an enlarged section partially broken away taken along line III—III of Fig. 2.

As shown in Figs. 1 and 3, each bearing housing 24 has a pair of outreaching axially extending flanges 47, 48 defined thereupon respectively adjacent and remote shell 12 and substantially in register respectively with outwardly extending radial flanges 33, 34 of trunnion journal portion 31. Intermediate each of the corresponding bearing housing flanges and trunnion journal portion flanges, for example, housing flange 48 and trunnion flange 34, at each side of bearing housing 24, a ring shaped support member 50 is suitably secured to bearing housing 24, as with key 51 or the like, and thereby will remain stationary relative to trunnion journal portion 31 during the rotation thereof.

As shown in detail in Fig. 3, support member 50 extends radially inwardly (relative to bearing housing 24) partially into a groove 52, defined in trunnion flange 33 by a pair of spaced substantially parallel side walls 53, 54 and a bottom wall 55, to define with bottom wall 55 an annular chamber 56 and to provide a running fit with side walls 53, 54. Each trunnion flange, for example flange 33, is thereby divided into an inboard surface 57, lying between groove 52 and bearing saddle 28, and an outboard surface 58, lying between groove 52 and the adjacent end of the machine.

Figure 4:
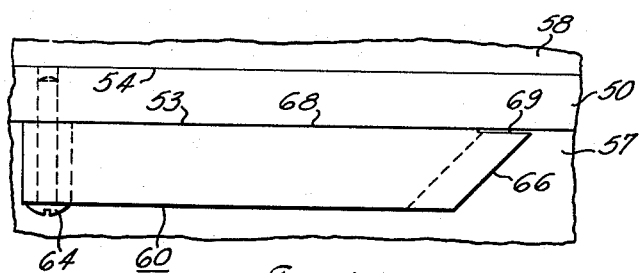
Fig. 4 is an enlarged plan view of the wiping means and support means of Fig. 2.

A wiper member 60 comprising an eye portion 61, an arm portion 62 and a head portion 63 is pivotally secured to the ring member 50 by any suitable means such as bolt 64 passing through eye portion 61 into threaded engagement with ring member 50 as shown in Fig. 4.

An essential feature of the present invention lies in the special position of wiping member 60 relative to ring shaped support member 50 and will be more fully explained.

Figure 5:
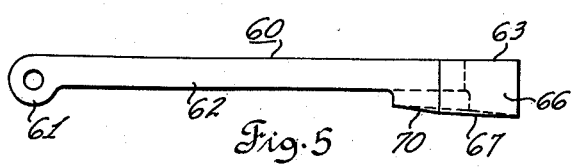
Fig. 5 is a side elevation of the wiping means of Fig. 4.

As shown in Figs. 4 and 5, wiper member 60 comprises a head portion 63 having a surface 66 disposed transversely of both ring member 50 and the periphery of trunnion journal portion 31 and defines a leading edge 67 which engages trunnion flange 33, and more specifically inboard surface 57 thereof, in a scraping wiping relationship thereto, whereupon the lubricant carried thereby is diverted and scraped back toward bearing 25. Wiping surface 66 is slightly offset, in the magnitude of about 1/32 to about 1/8 of an inch, from inner surface 68 of arm portion 62 which rides ring member 50, to define notch means 69 which prevents the formation of a meniscus between the wiper member 60 and ring member 50 which otherwise would stimulate the accumulation and leakage of lubricant at the junction of those members. The bottom surface 70 of head member 63 may be formed to conform to the peripheral contour of trunnion flange 33 although it is found that a slight bevel, as shown in Fig. 5, provides excellent results in maintaining leading edge 67 in firm conforming engagement with the rotating trunnion flange 33 at all times.

Figure 2:
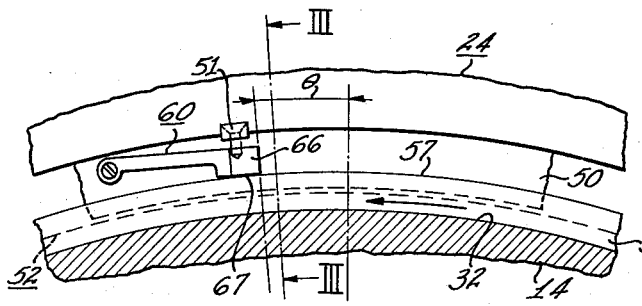
Fig. 2 is an enlarged section partially broken away taken along line II—II of Fig. 1.

As mentioned previously, an important feature of the present invention is the positioning of wiper member 60 and ring member 50 relative to each other. In the practice of the present invention, the improved results herein described are obtained when leading edge 67 of wiper member 60 is secured to ring member 50 so that leading edge 67 is angularly disposed from the vertical center line of the trunnion journal portion 31 on the downrunning side thereof, to define an angle $\theta$ (see Fig. 2) therewith. While satisfactory results are obtained when angle $\theta$ has values of from about two degrees to about twenty degrees on the downrunning side of center, preferred results are obtained when angle $\theta$ defines angles of about four to about fifteen degrees and excellent results are obtained. When positioned within the segment in the illustrated embodiment having an angle $\theta$ equal to about five degrees defined by the maximum and minimum values for $\theta$ above described, the lubricant disposed upon the surface of the trunnion flange 33, and more particularly upon the inboard portion 57 thereof, is engaged by face 66 and wiped in a direction away from ring member 50 to prevent the leakage of the lubricant through chamber 56 lying between the ring member 50 and trunnion journal portion 31, and hence through the inner face between the housing rim 59 and the outboard portion 58 of the trunnion flange 33 to the outer surface of bearing assembly 18.

If the wiper means 60 are positioned on the upflow side of the vertical center line of trunnion 14, it is found that the lubricant does not wipe to one side as desired, but rather accumulates in a corner between ring 50 and surface 66 until the accumulation becomes large enough to respond to gravity and flow back down the trunnion. When the leading edge of the wiper is disposed or defines an angle greater than twenty degrees from the vertical center line of the trunnion on the downflow side, the lubricant is not directed but rather accumulates and overrides the wiper to run back against the ring member 50 to cause leakage. In the preferred segment, i.e., when $\theta$ has values between about two degrees and twenty degrees, adjacent the top of the trunnion, however, the oil or other lubricant is readily wiped and gravity forces upon the oil are overcome. Thus, as the oil works laterally along the trunnion flange, the wiper effectively blocks the flow and the ring support 50 further coacts therewith to dam the flow into effective range of the wiper surface 66.

Notch 69 is of significance since it prevents a meniscus from forming between the wiper member 60 and the ring member 50 which otherwise could cause the lubricant to follow the wiper face 66 to the junction of the wiper member 60, the ring member 50 and the trunnion journal portion 31, and feed lubricant directly into the trunnion groove 52 from where it can readily escape.

In operation, as the lubricated bearing surface 32 of trunnion journal portion 31 rotates into engagement with the blade surface 66 of the wiper member 60, the lubricant is wiped in a direction away from groove 52 by the coaction of the special configuration of the wiper member and the gravity loading placed thereupon, thereby substantially eliminating all leakage of lubricant from within the bearing housing.

As becomes readily apparent from the foregoing description, improved means are presented which, by virtue of their design and construction, readily conform to axial expansion and contraction of the seal by riding the ring including a wiper member which readily compensates and adjusts itself to all prevailing conditions of wear existing on both the trunnion surface and on its lower edge. Complete surface engagement between the trunnion and the wiper member is further maintained during operation by gravity acting upon the pivotally mounted wiper member. The present invention thus fulfills beyond expectation all of the objectives hereinbefore set forth.

It is understood, however, that the drawing and description of the exemplary embodiments herein are intended only as illustrative of the present invention and not by way of limitation, it being intended that such modifications and applications of this invention as may readily occur to one skilled in the art are within the spirit of this invention, especially as defined by the claims appended hereto.

Having now particularly described and ascertained the nature of our said invention and the manner in which it is to be performed, we declare that what we claim is:

1. In a bearing assembly including a bearing supporting a heavily loaded rotatable member in surface contact therewith for rotation relative thereto, means for continuously flushing the contacting surfaces of the rotatable member and the bearing with lubricant during the relative rotation thereof, and a housing containing the bearing and means and circumscribing a portion of the rotatable member in running fit relationship thereto, improved means for preventing leakage of the lubricant from within the housing through the running fit between the housing and the rotatable member during the rotation thereof, said means comprising: a ring shaped supporting member interposable between the housing and the portion of the rotatable member in running fit relationship thereto and securable in a stationary position relative to the housing in circumscription of the rotatable member; and a wiper member pivotally secured at one end to said ring member and having at another end a blade face extending obliquely from said ring member toward said one end and defining an angle $\theta$ in the direction of rotation of the rotatable member with an axis extending vertically from the center of rotation of the rotatable member where $\theta$ equals from two to about twenty degrees.

2. In a bearing assembly including a bearing supporting a heavily loaded rotatable member in surface contact therewith for rotation relative thereto, means for continuously flushing the contacting surfaces of the rotatable member and the bearing with lubricant during the relative rotation thereof, and a housing containing the bearing and means and circumscribing a portion of the rotatable member in running fit relationship thereto, improved means for preventing the leakage of the lubricant from within the housing through the running fit between the housing and the rotatable member during the rotation thereof, said means comprising: a ring shaped supporting member interposable between the housing and the portion of the rotatable member in running fit relationship thereto and securable in a stationary position relative to the housing in circumscription of the rotatable member; and a wiper member pivotally secured at one end to said ring member and having at another end a blade face extending obliquely from said ring member toward said one end and defining an angle $\theta$ in the direction of rotation of the rotatable member with an axis extending vertically from the center of rotation of the rotatable member where $\theta$ equals from about four to about fifteen degrees.

3. In a bearing assembly including a bearing supporting a heavily loaded rotatable member in surface contact therewith for rotation relative thereto, means for continuously flushing the contacting surfaces of the rotatable member and the bearing with lubricant during the relative rotation thereof, and a housing containing the bearing and means and circumscribing a portion of the rotatable member in running fit relationship thereto, improved means for preventing the leakage of the lubricant from within the housing through the running fit between the housing and the rotatable member during the rotation thereof, said means comprising: a ring shaped supporting member interposable between the housing and the portion of the rotatable member in running fit relationship thereto and securable in a stationary position relative to the housing in circumscription of the rotatable member; and a wiper member pivotally secured at one end to said ring member and having at another end a blade face extending obliquely from said ring member toward said one end and defining an angle of about five degrees in the direction of rotation of the rotatable member with an axis extending vertically from the center of rotation of the rotatable member.

4. In a bearing assembly including a bearing supporting a rotatable member for rotation relative thereto, lubrication means for supplying the rotatable member and the bearing with lubricant during the relative rotation thereof, and housing means for containing the bearing and lubrication means and a portion of the rotatable member, improved means for preventing the leakage of the lubricant from within the housing between the housing and the rotatable member during the rotation thereof, said means comprising: a ring shaped supporting member interposable between the housing and the rotatable member and secured to the housing; and a wiper member pivotally secured to said ring member and having at its free end a blade face extending transversely away from the surface of said supporting member adjacent thereto and defining with an axis extending vertically from the center of rotation of the rotatable member an angle $\theta$ in the direction of rotation of the rotatable member where $\theta$ equals from two to about twenty degrees.

5. In a bearing assembly including a bearing supporting a rotatable member for rotation relative thereto, lubrication means for supplying the member and the bearing with lubricant during the relative rotation therebetween, and housing means for containing the bearing, lubrication means and a portion of the rotatable member, improved means for preventing the leakage of the lubricant from within the housing between the housing and the rotatable member during the rotation thereof, said means comprising: a ring shaped supporting member interposable between the housing and the rotatable member and secured to the housing; and an elongated wiper member having one end pivotally secured to said ring member and another end freely bearing upon the rotatable member in response only to gravity thereupon, said free end having a blade face extending obliquely away from said supporting member and defining with an axis extending vertically from the center of rotation of the rotatable member an angle $\theta$ in the direction of rotation of the rotatable member where $\theta$ equals from two to about twenty degrees.

6. A nonleaking bearing assembly supporting a loaded rotatable member extending therethrough for rotation relative thereto comprising: a base; housing means mounted upon said base in stationary relationship thereto, said housing means having an outer shell defining a cylindrical cavity therethrough, said shell having first and second annular flange members extending axially outwardly therefrom and adapted for running engagement with a loaded rotatable member; a bearing support mounted in said cavity adjacent said said base and having a concave inner surface defined thereupon; a bearing mounted upon said bearing support and having a convex outer surface in substantially complementary engagement with said concave surface of said support, said bearing having an inner arcuate surface adapted to support a loaded rotatable member in rotating relationship relative thereto; lubrication means operatively disposed within said housing to flush with lubricant said bearing and the rotatable member during the relative rotation therebetween; and means for preventing the escape of lubricant from within said cavity comprising a rigid ring shaped support member secured to each of said first and second flanges and extending radially inwardly therefrom for a distance greater than the clearance between the rotating member and said annular flange when the rotating member is extended therethrough and a gravity loaded wiper member having a first end pivotally attached to said ring member and a second end having an oblique wiping surface defined thereupon and extending back from close spaced proximity to said ring member to divert the flow of lubricant away therefrom, said second end having a beveled bottom surface adapted for line engagement with the rotatable member passing thereby, said engagement being maintainable by the action of gravity upon said member, said wiping surface defining an angle $\theta$ in the direction of rotation of the rotatable member with an axis extending vertically from the center of rotation thereof where $\theta$ equals from two to about twenty degrees.

7. A nonleaking bearing assembly comprising: a base; housing means mounted upon said base in stationary relationship thereto, said housing means having an outer shell defining a cylindrical cavity therethrough, a rotatable member extending through said cavity for rotation relative thereto; said shell having first and second annular flange members extending axially outwardly therefrom into spaced proximity with said loaded rotatable member; a bearing support mounted in said cavity adjacent said base and having a concave inner surface defined thereupon; a bearing mounted upon said bearing support and having a convex outer surface in substantially complementary engagement with said concave surface of said support, said bearing having an inner arcuate surface for supporting said rotatable member for rotation relative thereto; lubrication means operatively disposed upon said rotatable member within said housing to flush with lubricant said bearing and said rotatable member during the relative rotation therebetween; and means for preventing the escape of lubricant from within said cavity having a rigid ring shaped support member secured to each of said first and second flanges and extending radially inwardly therefrom for a distance greater than said spaced proximity between said rotating member and said annular flange and a gravity loaded wiper member having a first end pivotally attached to said ring member and a second end having an oblique wiping surface defined thereupon and extending back from close spaced proximity to said ring member to divert the flow of lubricant away therefrom, said second end having a beveled bottom surface adapted for line engagement with said rotatable member, said engagement being maintained by the action of gravity upon said member, said wiping surface defining an angle $\theta$ in the direction of rotation of said rotating member with an axis extending vertically from the center of rotation thereof where $\theta$ equals from two to about twenty degrees.

8. In a bearing assembly including a bearing supporting a loaded rotatable member extending therethrough, a housing, a flow of lubricant therein and a combination dam and gravity loaded wiper secured thereto for simultaneously damming and wiping said flow of lubricant to prevent the escape thereof from within said housing, said wiper being pivotally attached to said dam and presenting a wiping surface to define, with an axis extending vertically from the center of rotation of the rotatable member, an angle $\theta$ where $\theta$ equals two to twenty degrees in the direction of rotation of the member.

9. A nonleaking bearing assembly for supporting a loaded rotatable member extending therethrough for rotation relative thereto comprising: a base; housing means mounted upon said base in stationary relationship thereto, and having first and second annular flange members extending axially outwardly therefrom to define a cylindrical rotatable member receiving cavity therewith; a bearing mounted within said housing and having an inner arcuate surface for supporting in rotating relationship relative thereto a rotatable member insertable through said cylindrical cavity; a rotatable member extending through said cylindrical cavity; means disposed within said housing to flush said bearing surface with lubricant; a pair of rigid ring shaped support members, one being secured to each of said first and second flanges and extending radially inwardly therefrom into insertable relationship with the rotatable member for relative movement therebetween; and a gravity loaded wiper member having a first end being pivotally attached to said ring shaped member and a second end being free, said second end having an oblique wiping surface defined thereupon and extending back from close spaced proximity to said ring shaped member away therefrom, said second end having a beveled bottom surface adapted for line engagement with a rotatable member passing thereby, said engagement maintainable by the action of gravity upon said member, said wiping surface defining an angle $\theta$ in the direction of rotation of the rotating member with an axis extending vertically from the center of rotation thereof where $\theta$ equals from two to about twenty degrees, said ring shaped member damming the flow of lubricant therepast and said wiper diverting the flow of dammed lubricant.

References Cited in the file of this patent

UNITED STATES PATENTS

| | | |
|---|---|---|
| 292,879 | Walker | Feb. 5, 1884 |
| 1,316,707 | Goodrich | Sept. 23, 1919 |
| 2,503,442 | Knapp et al. | Apr. 11, 1950 |